Dec. 23, 1969  T. McKENZIE ET AL  3,485,377
CHEESE DRAINAGE CONVEYOR

Filed July 10, 1967  4 Sheets-Sheet 1

Dec. 23, 1969    T. McKENZIE ET AL    3,485,377
CHEESE DRAINAGE CONVEYOR

Filed July 10, 1967    4 Sheets-Sheet 2

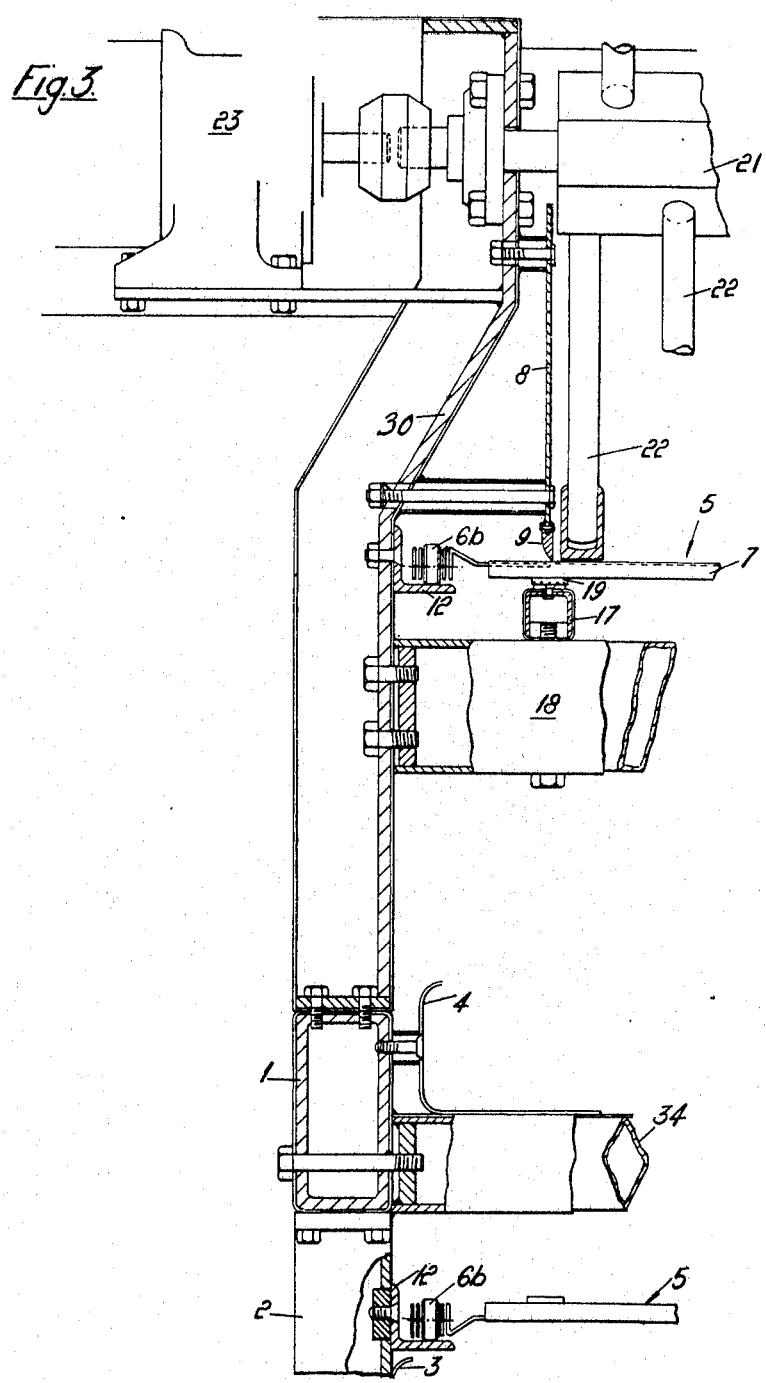

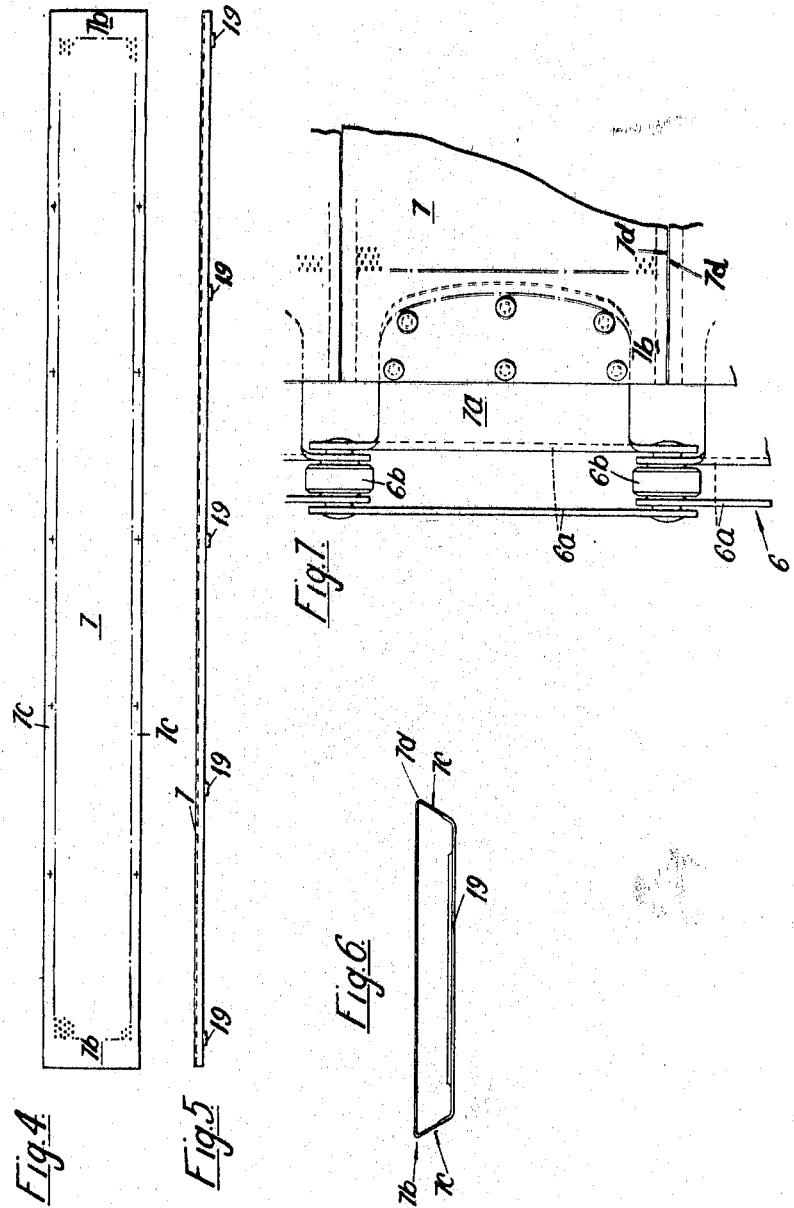

3,485,377
CHEESE DRAINAGE CONVEYOR
Thomas McKenzie and William Charles Ridley, both of 305A Church St., Onehunga, Auckland, New Zealand
Filed July 10, 1967, Ser. No. 652,268
Claims priority, application New Zealand, July 11, 1966, 145,696
Int. Cl. B01d 33/04
U.S. Cl. 210—383      9 Claims

ABSTRACT OF THE DISCLOSURE

A cheese drainage conveyor which has an inclined draining tray about which an endless conveyor runs longitudinal the tray to carry the cheese up the incline. The endless conveyor consists of a series of perforated plates mounted on an endless chain, the adjacent side edges of each plate being unperforated, bent through an acute angle, and hingeably connected to the adjacent plates so as to prevent the cheese from passing therethrough. Each plate has an unperforated sealing portion at each end. A beater unit is mounted over the endless conveyor for beating the cheese as it moves up the conveyor. A pair of stationary side members which extend above the conveyor form a seal with the unperforated end portions of each of the plates. A plurality of shoes are provided underneath each plate and there is a corresponding number of longitudinal bearing runners mounted on cross frame members beneath the upper run of the endless conveyor so that the shoes coact with the bearing runners to support the plates in a common inclined plane. The above named elements, namely, the draining tray, beater unit, side members and cross frame members are all mounted on an adjustable frame.

---

This invention relates to draining conveyors for use in draining mixtures of liquid and solid matter such as slurries of whey and cheese particles which require separation during the manufacture of cheese. It is to be understood, however, that the invention may be adapted for other draining purposes.

It is an object of this invention to provide an improved form of drainage conveyor which is of novel construction and of hygienic construction for use in the food processing industry and which is highly efficient in operation and which is nevertheless comparatively simple in construction and arrangement and requires little, if any, maintenance and attention. Other objects and advantages of the invention will be apparent from the following description.

According to one aspect of this invention the improved drainage conveyor comprises a series of perforated plates or slats mounted on endless chains and arranged for movement about a drainage tray and a pair of stationary side members arranged above the drainage tray and forming a seal against the plates or slats.

Figure 1:
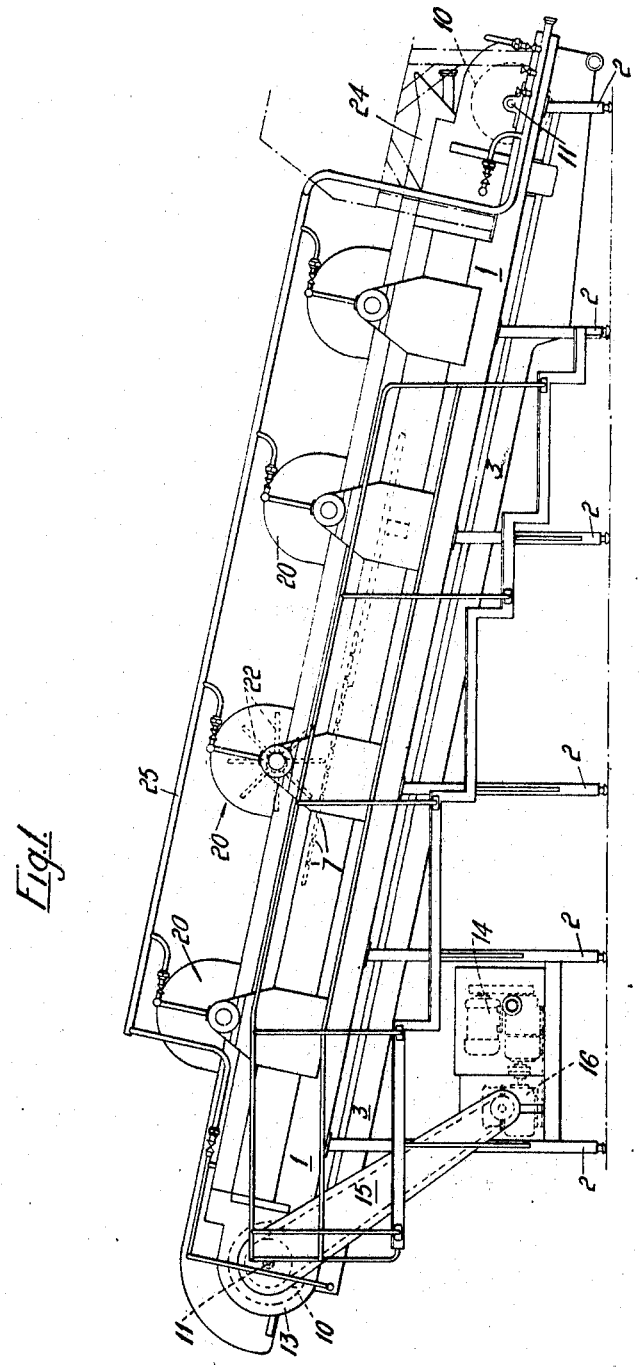
Figure 2:
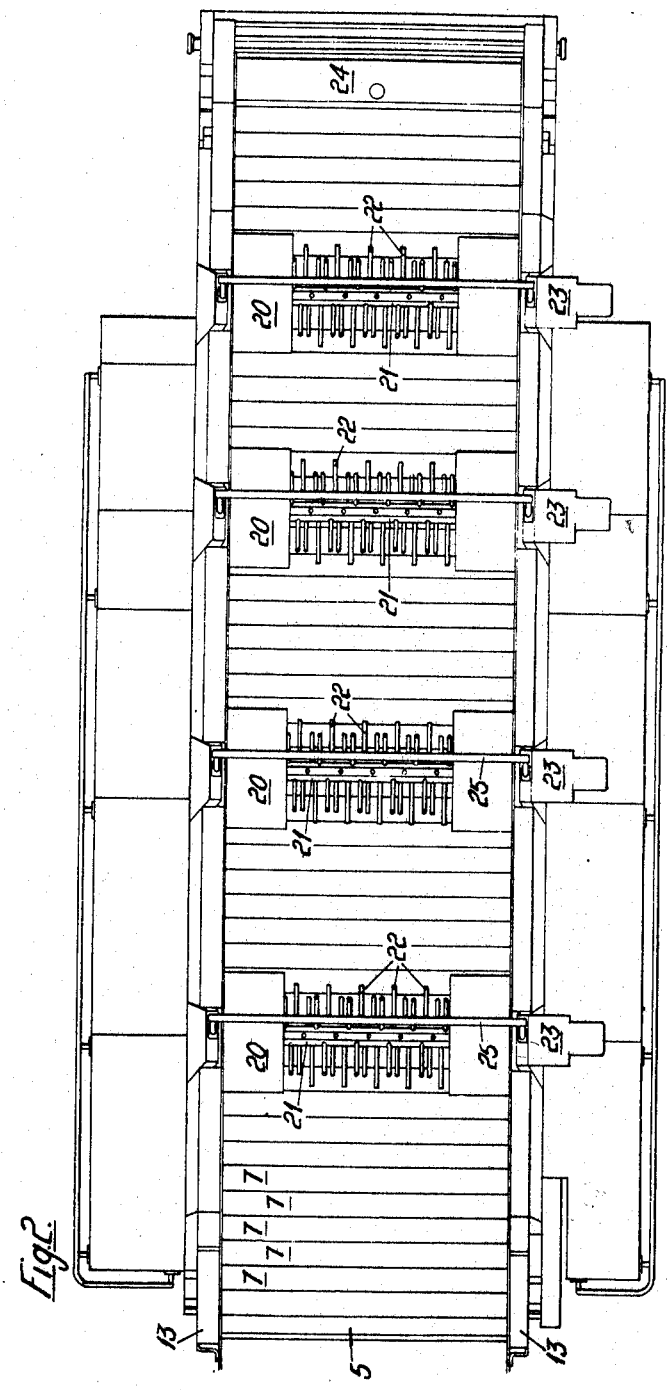

Other aspects of the invention, which should be considered in all its novel aspects, will be apparent from the following description, which is given by way of example, of a preferred embodiment of the invention and in which reference is made to the accompanying drawings, wherein:

FIG. 1 is an elevation of a preferred form of apparatus according to the invention,
FIG. 2 is a plan view of the apparatus,
FIG. 3 is a cross sectional elevation,
FIG. 4 is a schematic plan view of a plate prior to bending,
FIG. 5 is a side elevation of a formed plate,
FIG. 6 is an end elevation of a formed plate, and
FIG. 7 is a plan view of one end of the formed plate showing the connection to the endless chain.

In a preferred embodiment of the invention the drainage conveyor includes a frame which consists of a pair of longitudinal base members 1 from which a series of uprights 2 extend to support the frame. The uprights 2 are preferably adjustable so that they may support the frame either in a horizontal position or at a desired inclination (see FIG. 1). The uprights 2 in turn preferably support a lower draining tray 3 below the level of the frame members 1, the lower draining tray 3 preferably extending approximately the full length and width of the frame and preferably extending beyond that end of the endless conveyor 5 which is the lower end when the frame is inclined or the end onto which the material to be drained is fed.

Preferably two trays 3 and 4, are provided mounted one above the other, the upper tray 4 being mounted on frame cross members 34 extending between the longitudinal base members 1, the upper drainage tray 4 preferably being situated between the frame members 1 and between the top and bottom layers of the endless conveyor 5 (see FIG. 3).

The endless conveyor 5 is movable about the upper or main drainage tray 4 in the manner as will now be described. More specifically the endless conveyor 5 consists of two endless chains 6 of any suitable type and pitch and between which are secured a series of perforated plates or slats 7 which form the endless conveyor 5 already referred to. More particularly each plate 7 is of slat formation and is preferably formed of a suitable thickness rectangular sheet of stainless steel, and each end is secured to a cheek plate 7a of the endless chain 6 (see FIG. 7). The inner portion of each plate 7 is closely perforated as desired (see FIG. 4) and each end of each plate 7 is provided with a sealing portion 7b which is unperforated, and each side edge 7c of the plate 7 is also unperforated for a suitable width. The unperforated side edges 7c of the plates 7 are bent through an acute angle (see FIG. 6) so that the width of each plate 7 is substantially the same as the distance between centres of the links 6a of the endless chains 6 (see FIG. 7). The rounded edges 7d thus formed abut one another when the conveyor 5 is assembled and the abutting rounded edges 7d of the plates 7 are joined to one another by a number of split pins which are passed through suitable adjacent apertures formed in the rounded edges 7d of the plates.

In a preferred form of the invention a pair of side members 8 are provided which preferably extend the length of the conveyor and which are provided with seals 9 along their lower edges so that the upper travel of the endless conveyor 5 and the side members form a perforated trough above the upper draining tray 4. The side members 8 are suitably supported such as by brackets 30 from the frame members 1 of the apparatus. The seals 9 preferably comprise strips of resilient material such as Ferrobestos (an asbestos reinforced plastic material) or neoprene secured in liquid tight manner to the lower edge of the side members 8 and having pointed edges which contact the unperforated end portions 7b of the plates 7.

The chains 6 of the endless conveyor 5 are passed about suitable sprockets 10 which are mounted on shafts 11 positioned adjacent each end of the frame. The sprocket shafts 11 are turnable in bearings and the sprockets 10 themselves are preferably housed in covers 13. A suitable variable speed prime mover 14 is drivably connected to one of the sprockets 10 at a selected point on the endless conveyor. Preferably a chain and sprocket drive 15 is connected between one of the shafts 11 of the endless conveyor 5 and to the drive shaft of a suitable prime mover 14 such as an electric motor which is preferably mounted beneath the frame 1 and trays 3 and 4 and towards the end which, when the frame is tilted, is the raised end. A reduction gearing unit 16 can be connected to the electric motor 14 which in turn may drive the chain and sprocket drive 15 through a suitable hydraulic variable speed gear.

The endless conveyor 5 is supported, between the sprockets 10 positioned adjacent the ends of the frame, by upper and lower tracks 12. The tracks 12 may consist of lengths of stainless steel secured to the sides of the apparatus. The endless conveyor 5 is formed with freely rotating wheels 6b on each joint of the endless chains 6, the said wheels 6b engaging on the tracks 12 and thereby supporting the endless conveyor 5.

The upper run of the conveyor 5, extending above the upper or main drain tray 4, and which in use must support the weight of the material to be drained, is provided with additional supports in the form of longitudinal bearing runners 17. A suitable number of such bearing runners 17, which are supported above the upper drain tray 4 by supporting cross members 18, are preferably equally spaced and are preferably formed with upper bearing surfaces of low friction material, such as from a tape of poly tetra fluoro ethylene, riveted to the bearing runners 17. A number of metal shoes 19, corresponding to the number of the bearing runners 17, are secured underneath each plate 7 and are so arranged that when the endless conveyor 5 travels above the draining tray 4 and is weighted down by the material to be drained, the endless conveyor 5 is supported at the sides by the wheels 6b running on the tracks 12 as described above, and is supported between the sides by the shoes bearing 19 on the bearing runners 17.

The apparatus described above is particularly useful in the treatment of food products such as cheese and a number of beater or stirrer units 20 may be mounted over the upper run of the endless conveyor 5 and adapted to beat or treat the mixture being drained, such as cheese or cheese particles, as the mixture passes along the conveyor, or when titled, up the incline of the trough formed between the stationary sides 8 and the endless conveyor 5. The beater units 20 preferably comprise a shaft 21 mounted horizontally across the endless conveyor 5, and provided with a series of beater arms 22 extending radially from the shaft 21, the shafts being mounted in suitable bearings and drivably connected to prime movers such as electric motors 23.

Towards one end of the endless conveyor 5, which is preferably the lower end when the conveyor is tilted, there is provided a receiving chute 24 through which the mixture, such as a cheese and whey mixture, to be drained and treated, is pumped on to the endless conveyor 5. The cheese particles and whey are pumped through a supply hose into the chute 24 to pass down the incline of the chute 24 and on to the commencement of the endless conveyor 5 where draining immediately commences. Whey and other liquid is drained from the cheese particles through the perforations as the endless conveyor carries the cheese particles above the draining tray 4.

In a preferred form of the invention a built-in type cleaning apparatus 25 is provided whereby water or other liquid can be conveyed to selected portions of the apparatus for spraying of the apparatus. For instance a series of pipes can be provided with a series of nozzles therein.

Each pipe is connected to a source of supply and heated water or other liquid is passed through the pipe for spraying through the nozzles.

If desired, the apparatus may be provided with a number of stop buttons positioned at different points about the apparatus, each stop button being connected in the main circuit controlling the operation of the electric motor driving the endless conveyor.

It is to be understood that although the invention has been particularly described, by way of example, with reference to a preferred embodiment, the invention is not limited thereto and modifications may be made without departing from the scope of the invention as defined in the appended claims.

We claim:
1. Apparatus for use in draining solids such as cheese comprising an inclined draining tray; an endless conveyor movable longitudinally about said tray and adapted to carry the solids up the incline, said endless conveyor containing a series of perforated plates mounted on endless chains, the adjacent side edges of each plate being unperforated, bent through an acute angle, and hingeably connected to the adjacent plates so as to prevent the passage of solids therethrough, and each plate having an unperforated sealing portion at each end thereof; a beater unit mounted over said endless conveyor and adapted to beat the solids as the solids move up the incline on said endless conveyors; a pair of stationary side members extending above said endless conveyor and forming a seal with the unperforated sealing portions at the ends of said plates; a plurality of shoes provided underneath each plate which coact with a corresponding number of longitudinal bearing runners mounted on cross frame members underneath the upper run of said endless conveyor so as to support said plates in a common inclined plane; and a frame upon which is mounted said tray, beater unit, side members and cross frame members.

2. Apparatus as claimed in claim 1 wherein said side members extend substantially the length of said endless conveyor, and are provided with resilient seals along their lower edges to form said seal with said plate sealing portions.

3. Apparatus as claimed in claim 1 wherein said frame consists of a pair of longitudinal base members from which a series of uprights extend capable of supporting said base members.

4. Apparatus as claimed in claim 1 wherein a second inclined draining tray is provided which is mounted below the lower level of said endless conveyor, said second draining tray extending approximately the full length of said frame and beyond said endless conveyor at the lower end thereof above which is placed a receiving chute adapted to receive the solids to be drained.

5. Apparatus as claimed in claim 4 wherein the chains of said endless conveyor are passed about sprockets mounted on shafts positioned adjacent each end of said frame.

6. Apparatus as claimed in claim 5 wherein each beater unit comprises a shaft mounted horizontally across said endless conveyor and provided with a series of beater arms extending radially therefrom and drivably connected to a prime mover.

7. Apparatus as claimed in claim 1 wherein said longitudinal bearing runners are provided with bearing surfaces of low friction material.

8. Apparatus as claimed in claim 7 wherein said endless conveyor is formed with freely rotating wheels on each joint of said endless chains and wherein said wheels ride on tracks attached to said frame so as to support said endless conveyor.

9. Apparatus as claimed in claim 1 wherein a built-in cleaning device is provided having means to convey liquid to selected portions of said apparatus for spray cleaning.

(References on following page)

References Cited

UNITED STATES PATENTS

| | | | |
|---|---|---|---|
| 588,459 | 8/1897 | Mayo | 198—197 X |
| 729,296 | 5/1903 | Edgerton | 210—400 X |
| 1,112,948 | 10/1914 | Turnbull | 198—196 |
| 1,211,294 | 1/1917 | Curtis | 198—196 |
| 1,559,535 | 10/1925 | Roddy et al. | 210—400 X |
| 1,780,954 | 11/1930 | Tomkins | 210—400 |
| 2,619,232 | 11/1952 | Parsons et al. | 210—391 X |
| 2,819,846 | 1/1958 | Smith | 209—308 X |
| 2,873,028 | 2/1959 | Bried | 210—400 X |

REUBEN FRIEDMAN, Primary Examiner

J. W. ADEE, Assistant Examiner

U.S. Cl. X.R.

210—391, 400